(12) United States Patent
Zhang et al.

(10) Patent No.: US 11,752,956 B2
(45) Date of Patent: Sep. 12, 2023

(54) TRIM ASSEMBLY FOR A VEHICLE SEAT ASSEMBLY

(71) Applicant: Lear Corporation, Southfield, MI (US)

(72) Inventors: Huaying Zhang, Shanghai (CN); Yong Yang, Shanghai (CN); Jiajun Li, Shanghai (CN); Guohua Cai, Shanghai (CN); Yao Yao, Shanghai (CN)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 17/523,535

(22) Filed: Nov. 10, 2021

(65) Prior Publication Data

US 2022/0266767 A1 Aug. 25, 2022

(30) Foreign Application Priority Data

Feb. 23, 2021 (CN) .......................... 202110204111.4

(51) Int. Cl.
*B60R 13/02* (2006.01)

(52) U.S. Cl.
CPC ................................ *B60R 13/0275* (2013.01)

(58) Field of Classification Search
CPC ...... B60R 13/0275; B60N 2/206; B60N 2/36; B60N 2002/363
See application file for complete search history.

(56) References Cited

U.S. PATENT DOCUMENTS

| | | | | |
|---|---|---|---|---|
| 3,011,822 | A * | 12/1961 | May ..................... | B60N 2/3031 296/66 |
| 4,848,826 | A * | 7/1989 | Kuwabara ............ | B60N 2/3009 296/37.16 |
| 5,322,335 | A | 6/1994 | Niemi | |
| 5,664,822 | A * | 9/1997 | Rosenfield ............. | B60R 13/01 16/250 |
| 8,186,736 | B2 * | 5/2012 | Jouraku ................... | B60R 5/04 296/37.16 |
| 8,398,164 | B2 * | 3/2013 | Baker .................. | B60N 2/3011 297/188.1 |
| 8,439,419 | B2 * | 5/2013 | Zuelch .................... | B60R 5/006 296/65.16 |
| 8,505,999 | B2 * | 8/2013 | Whalen .................... | B60N 2/36 296/65.09 |
| 8,894,124 | B2 * | 11/2014 | Thota ........................ | B60N 2/36 296/65.09 |
| 9,050,913 | B2 * | 6/2015 | Thota ........................ | B60R 5/04 |
| 10,279,713 | B2 * | 5/2019 | Watanabe ............... | B60N 2/36 |
| 10,604,051 | B2 * | 3/2020 | Valencia Flores ....... | B60N 2/90 |
| 11,110,830 | B2 * | 9/2021 | Kondo ..................... | B60N 2/90 |
| 2013/0278007 | A1 * | 10/2013 | Preisler ................. | B60R 13/011 296/97.23 |

(Continued)

FOREIGN PATENT DOCUMENTS

| | | |
|---|---|---|
| DE | 102006006158 B3 | 3/2007 |
| GB | 1178805 | 1/1970 |

*Primary Examiner* — Jason S Morrow

(74) *Attorney, Agent, or Firm* — Brooks Kushman P.C.

(57) ABSTRACT

A trim assembly for a vehicle seat is provided with a first trim panel adapted to be pivotally connected to a lower region of a rear surface of a backrest that is pivotally adjustable relative to a seat cushion, to cover a gap between the backrest and the seat cushion in an upright position of the backrest. A second trim panel is connected to the first trim panel to cover the gap in a forward position of the backrest relative to the seat cushion.

20 Claims, 3 Drawing Sheets

(56) References Cited

U.S. PATENT DOCUMENTS

2016/0046220 A1* 2/2016 Styn .................... B60N 2/6009
                                                                       297/452.1
2022/0126740 A1* 4/2022 Koinuma ................ B60N 2/36

* cited by examiner

TRIM ASSEMBLY FOR A VEHICLE SEAT ASSEMBLY

CROSS-REFERENCE TO RELATED APPLICATION

This application claims foreign priority benefits under 35 U.S.C. § 119(a)-(d) to CN patent application 2021 102 041 11.4 filed Feb. 23, 2021, the disclosure of which is hereby incorporated by reference in its entirety.

TECHNICAL FIELD

Various embodiments relate to trim assemblies for vehicle seat assemblies.

BACKGROUND

Vehicle seat assemblies often includes a backrest pivotally connected to a seat cushion.

SUMMARY

According to an embodiment, a trim assembly for a vehicle seat is provided with a first trim panel adapted to be pivotally connected to a lower region of a rear surface of a backrest that is pivotally adjustable relative to a seat cushion, to cover a gap between the backrest and the seat cushion in an upright position of the backrest. A second trim panel is connected to the first trim panel to cover the gap in a forward position of the backrest relative to the seat cushion.

According to a further embodiment, the second trim panel is pivotally connected to the first trim panel to pivot away from the seat cushion in a rearward position of the backrest.

According to an even further embodiment, a third trim panel is pivotally connected to the second trim panel and spaced apart from the first trim panel to cover a portion of the seat cushion in the forward position.

According to another even further embodiment, the trim assembly is provided with only three trim panels.

According to another further embodiment, the third trim panel is sized to contact and slide upon a vehicle floor in the rearward position.

According to another further embodiment, the third trim panel is provided with a plastic board.

According to another further embodiment, a first strip of nonwoven material interconnects the first trim panel and the second trim panel.

According to an even further embodiment, a third trim panel is pivotally connected to the second trim panel and spaced apart from the first trim panel to cover a portion of the seat cushion in the forward position. A second strip of nonwoven material interconnects the third trim panel and the second trim panel.

According to an even further embodiment, the first trim panel, the second trim panel, and the third trim panel, are each provided with carpet over the trim panel.

According to another further embodiment, a biasing member is attached to the first trim panel to bias the first panel against the rear surface of the backrest.

According to an even further embodiment, the biasing member is further provided with a plurality of elastic bands.

According to an even further embodiment, the plurality of elastic bands is sewn to one of the trim panels.

According to another further embodiment, the first trim panel and the second trim panel are each provided with a plastic board.

According to another embodiment, a vehicle seat assembly is provided with a seat cushion. A backrest is pivotally connected to the seat cushion. A trim assembly for a vehicle seat is provided with a first trim panel pivotally connected to a lower region of a rear surface of the backrest that is pivotally adjustable relative to the seat cushion, to cover a gap between the backrest and the seat cushion in an upright position of the backrest. A second trim panel is connected to the first trim panel to cover the gap in a forward position of the backrest relative to the seat cushion. The first trim panel is sewn to the lower region of the rear surface of the backrest.

According to a further embodiment, the backrest is pivotally connected to the seat cushion between a forward position and a rearward position.

According to another further embodiment, the trim assembly is displaced over the seat cushion in the forward position to cover a gap between the backrest and the seat cushion.

According to another embodiment, a trim assembly for a vehicle seat is provided with a first trim panel adapted to be pivotally connected to a lower region of a rear surface of a backrest that is pivotally adjustable relative to a seat cushion, to cover a gap between the backrest and the seat cushion in an upright position of the backrest. Additionally, the trim assembly has a biasing member attached to the first trim panel to bias the first trim panel against the rear surface of the backrest.

According to a further embodiment, the trim assembly is provided with only three trim panels.

According to another embodiment, a vehicle seat assembly is provided with a seat cushion, a backrest pivotally connected to the seat cushion between a forward position and a rearward position, and three trim panels. A first trim panel pivotally connected to a lower region of a rear surface of the backrest to cover a gap between the backrest and the seat cushion in an upright position of the backrest. A second trim panel pivotally connected to the first trim panel to cover the gap in the forward position of the backrest relative to the seat cushion, and to pivot away from the seat cushion in the rearward position of the backrest. A third trim panel pivotally connected to the second trim panel and spaced apart from the first trim panel to cover a portion of the seat cushion in the forward position, wherein the third trim panel is sized to contact and slide upon a vehicle floor in the rearward position. The vehicle seat assembly is also provided with a plurality of elastic bands sewn to the first trim panel and the backrest to bias the first trim panel against the rear surface of the backrest. A first strip of nonwoven material interconnecting the first trim panel and the second trim panel, and a second strip of nonwoven material interconnecting the third trim panel and the second trim panel. The vehicle seat assembly is also provided with a carpet material that covers the first trim panel, the second trim panel, and the third trim panel; and wherein the first, second and third trim panels are displaced over the seat cushion in the forward position to cover the gap between the backrest and the cushion.

According to a further embodiment, the trim assembly is provided with only three trim panels.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Conventionally, for a vehicle seat assembly, a backrest is pivotally connected to a seat cushion for adjustment of recline of the backrest. Additionally, the backrest may pivot forward to a position whereby the backrest lies flat upon the seat cushion so that a rear surface of the backrest operates as a load floor for cargo. The backrest may also recline rearward to a position flat and adjacent to the seat cushion to provide a reclined seating or lying position for an occupant. Such adjustability may provide clearance between the backrest and the seat cushion, which may form a gap.

Figure 1:
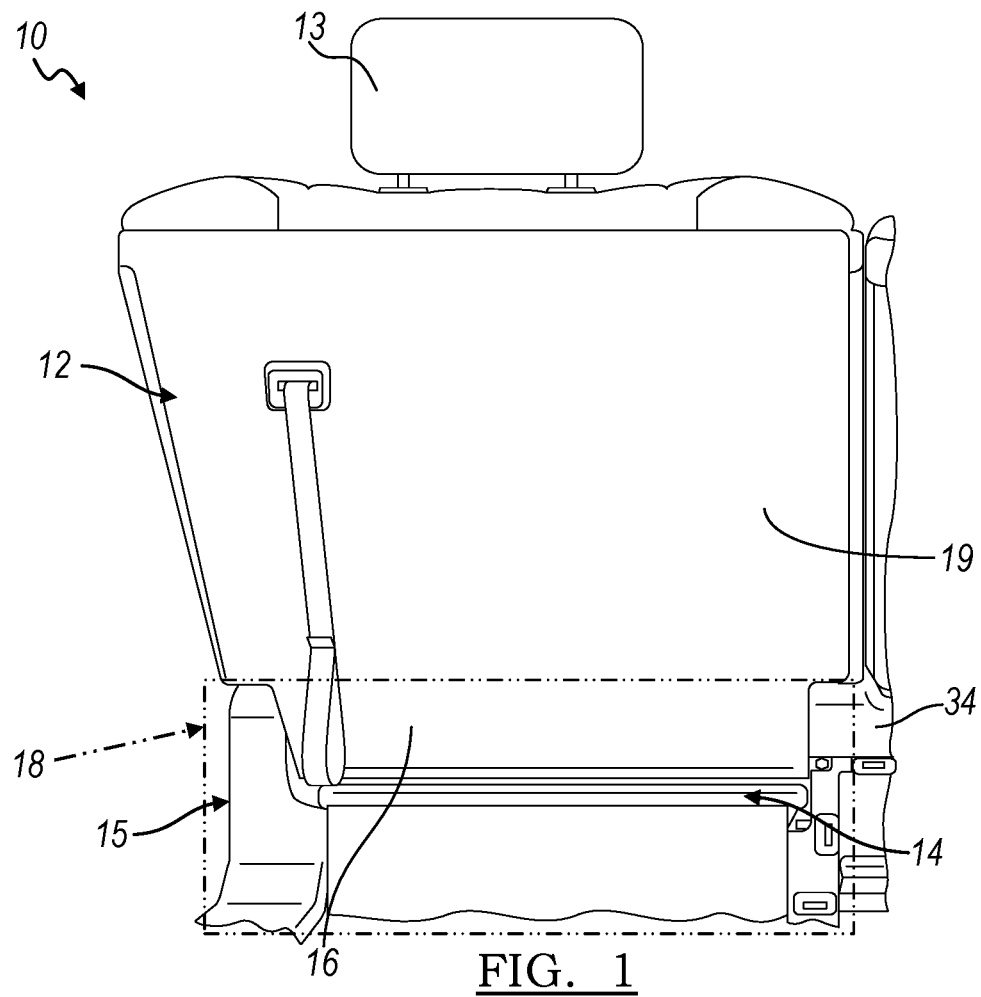
FIG. 1 is a rear perspective view of a seat assembly according to an embodiment.

FIG. 1 illustrates a rear perspective of a seat assembly 10 according to an embodiment. The seat assembly 10 is depicted in an upright or design position for supporting a passenger in a seating position. Although the seat assembly 10 is illustrated as a vehicle seat assembly, the seat assembly 10 may be utilized for any seating arrangement, such as a land vehicle, a lounge chair, aircraft, watercraft, or the like.

The seat assembly 10 includes a backrest 12 pivotally connected to a seat cushion 14. The seat cushion 14 is adapted to be mounted to a vehicle floor, as is known in the art. A head restraint 13 is supported upon the backrest 12 to receive and support a head of the occupant. The backrest 12 is connected to, and supported by, the seat cushion 14 by a recline mechanism 15 for permitting pivotal adjustment of the backrest 12 relative to the seat cushion 14. As illustrated, there is a gap 16 between the backrest 12 and the seat cushion 14. A trim assembly 18 is provided to act as a curtain to cover the gap 16.

The trim assembly 18 is illustrated in phantom in FIG. 1. The trim assembly 18 is illustrated in greater detail in FIGS. 2-6. The trim assembly 18 is sewn to a lower region of a rear surface 19 of the backrest 12 to cover the gap 16 when the backrest 12 is in the upright position of FIG. 1. The trim assembly 18 also covers the gap 16 in the forward position of the backrest 12 (FIGS. 2 and 3), and the rearward position of the backrest 12 (FIG. 4).

Figure 2:
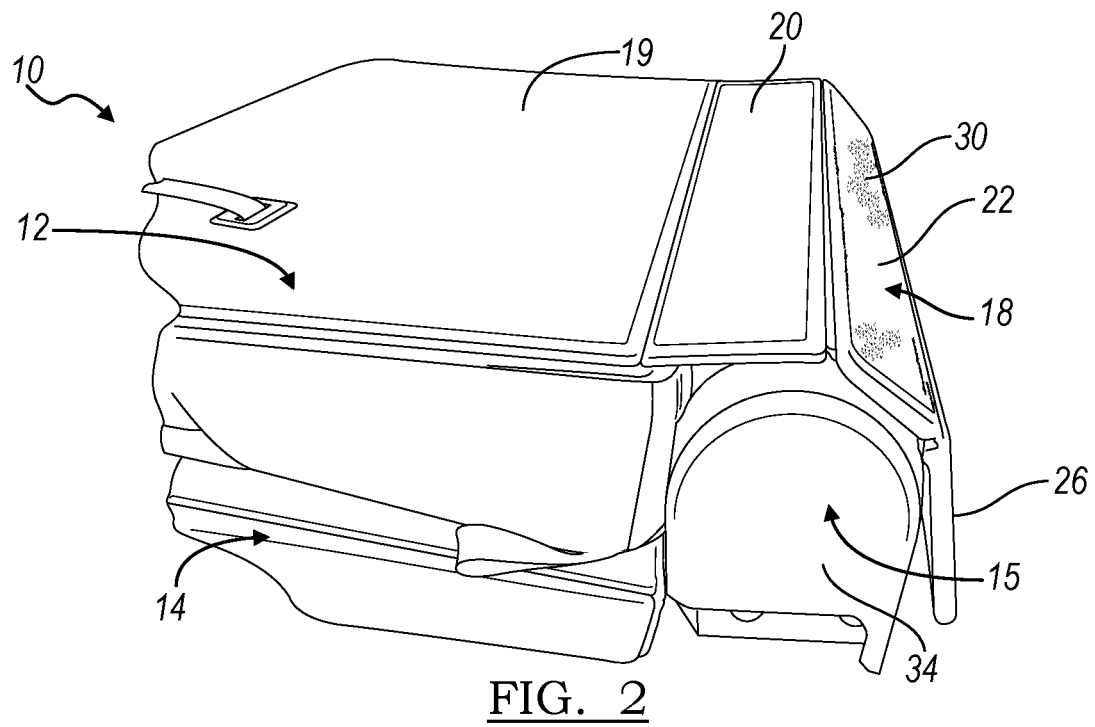
FIG. 2 is a left side perspective view of the seat assembly of FIG. 1, illustrated in a forward position.
Figure 3:
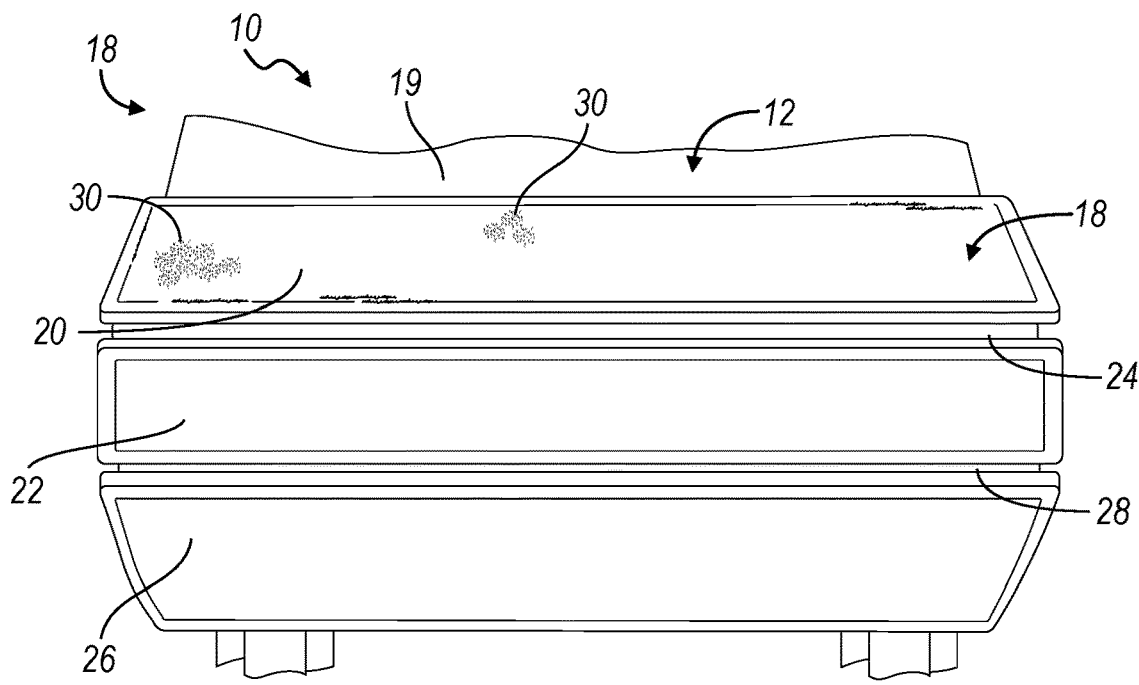
FIG. 3 is a rear perspective view of a trim assembly of the seat assembly of FIG. 1, illustrated in the forward position.

FIGS. 2 and 3 illustrate the seat assembly 10 in a forward position. The trim assembly 18 includes a first trim panel 20 pivotally connected to the lower region of the backrest 12 to cover the gap 16. A second trim panel 22 is connected to the first trim panel 20 to cover the gap 16 when the backrest 12 is in a forward position relative to the seat cushion 14. A third trim panel 26 is pivotally connected to the second trim panel 22 and spaced apart from the first trim panel 20 to cover a portion of the seat cushion 14 in the forward position.

Figure 4:
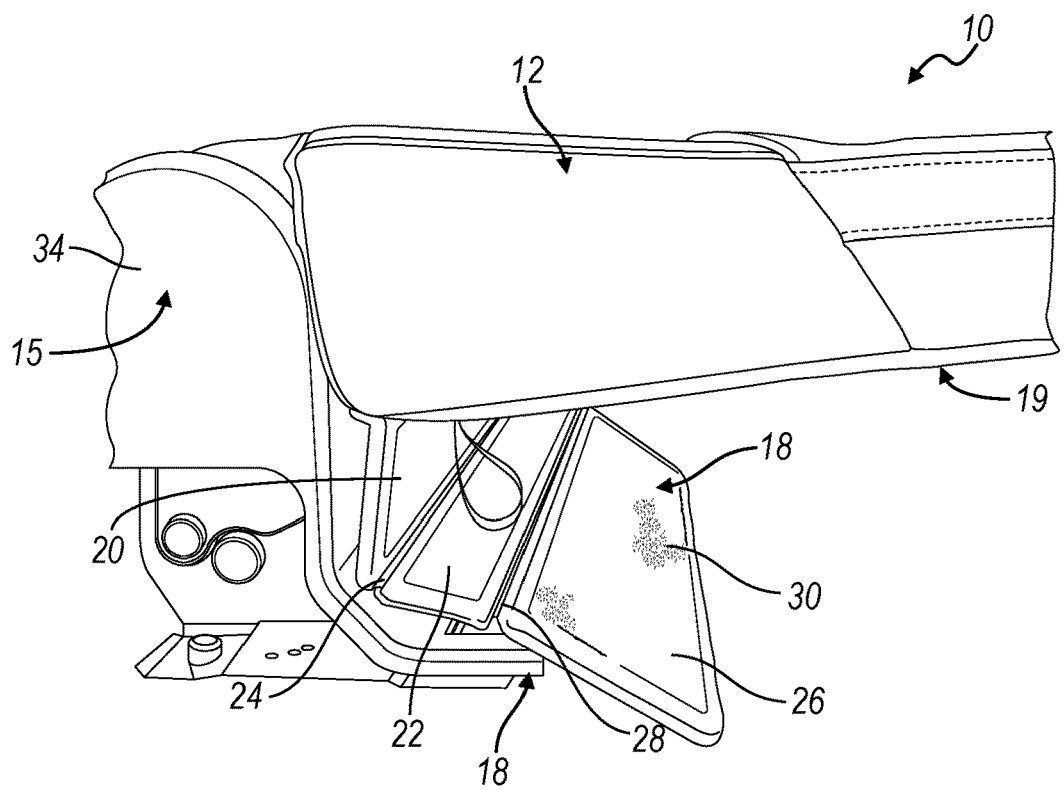
FIG. 4 is a left side perspective view of the seat assembly of FIG. 1, illustrated in a rearward position.

Referring now to FIG. 4, the trim assembly 18 is shown when the backrest 12 is reclined to a rearward position. It is shown that the second trim panel 22 is pivotally connected to the first trim panel 20 to pivot away from the seat cushion 14 when the backrest 12 is in a rearward position. Additionally, the third trim panel 26 is sized to contact and slide upon the vehicle floor in the rearward position to translate away from the seat cushion 14.

Referring to FIGS. 2-4, the trim assembly 18 is illustrated with three panels 20, 22, 26. Although three panels 20, 22, 26 are illustrated, any suitable plurality of panels may be employed to cover the gap 16 in the seat assembly 10. For the depicted embodiment, only three panels 20, 22, 26 are employed to cover the gap 16, and to move with the range of pivotal adjustment of the backrest 12 relative to the seat cushion 14.

Each of the trim panels 20, 22, 26 is formed from a polymeric material as a plastic board. A first strip of nonwoven material 24 interconnects the first trim panel 20 and the second trim panel 22. Likewise, a second strip of nonwoven material 28 interconnects the second trim panel 22 and the third trim panel 26. The nonwoven material 24, 28 is thin and flexible to interconnect sequential panels 20, 22, 26, while permitting the panels 20, 22, 26 to pivot relative to each other.

The first trim panel 20, the second trim panel 22, and the third trim panel 26, each have a carpet material 30 over the trim panel 20, 22, 26. The carpet material 30 is provided on a rear side of the panels 20, 22, 26, relative a front direction of the backrest 12, to be exposed away from the seat assembly 10. According to an embodiment, the trim panels 20, 22, 26 are sewn to the nonwoven material 24, 28 before the carpet material 30 is sewn over the trim panels 20, 22, 26 and the nonwoven material 24, 28. The carpet material 30 has a stiffness that is greater than the nonwoven material 24, 28 to protect the trim panels 20, 22, 26 from cargo and wear.

When the backrest 12 is the forward position of FIGS. 2 and 3, the first trim panel 20 and the second trim panel 22 cover the gap 16. In this position, the trim assembly 18 also forms part of a load floor for cargo with the rear surface 19 of the backrest 12. The rear surface 19 of the backrest 12 is also carpeted.

Figure 5:
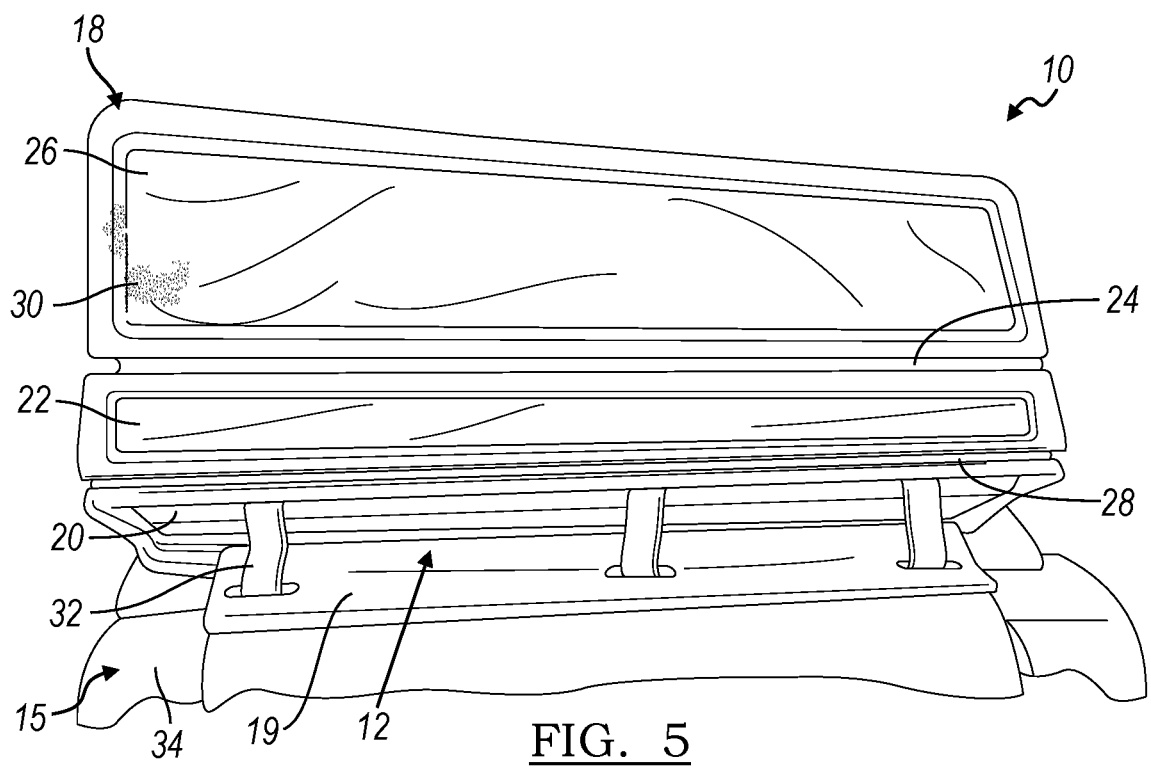
FIG. 5 is a front perspective view of the trim assembly of the seat assembly of FIG. 1, illustrated with biasing members.
Figure 6:
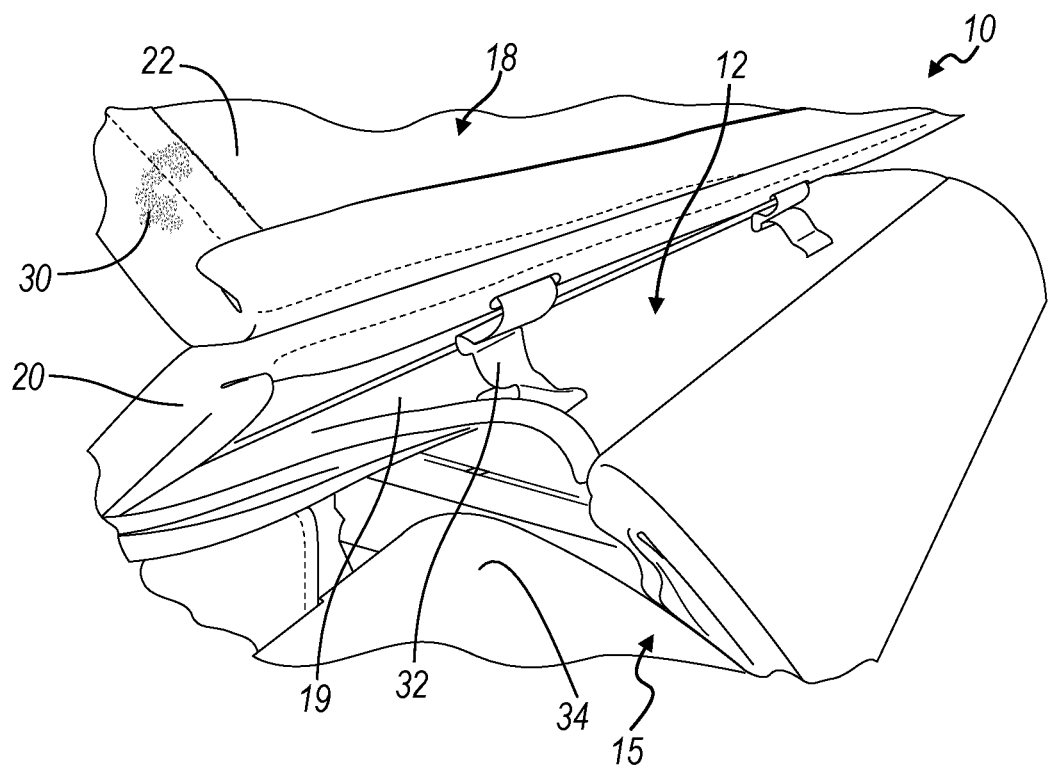
FIG. 6 is a left side perspective view of the trim assembly and biasing members of FIG. 5.

Referring now to FIGS. 5 and 6, biasing members 32 are attached to the first trim panel 20 and a lower region of the rear surface 19 of the backrest 12 to bias the first trim panel 20 against the rear surface of the backrest 12. The biasing member 32 can be made of elastic bands, which are sewn to the first trim panel 20 and the backrest rear surface 19.

Referring again to FIG. 1, in the upright position of the seat assembly 10, the trim assembly 18 extends downward from the backrest 12. The elastic bands 32 retract the first trim panel 20 against the rear surface 19 of the backrest 12. The second trim panel 22 and the third trim panel 26 extend from the first trim panel 20 in an upright orientation, along a housing 34 of the recline mechanism 15. When the backrest 12 is pivoted to the forward position of FIGS. 2, and 3, the first trim panel 20 is pivoted generally flat upon the rear surface 19 of the backrest 12. Consequently, the second trim panel 22 lies upon the recline mechanism housing 34, pivoted below the first trim panel 20, and covering the gap 16. The third trim panel 26 hangs from second trim panel 22 along the recline mechanism housing 34 covering a portion of the seat cushion 14.

When the backrest 12, is pivoted rearward to the position of FIG. 4, the third trim panel 26 slides along the recline mechanism housing 34 and the vehicle floor to pivot away from the seat cushion 14. The second trim panel 22 also slides along the recline mechanism housing 34 and is pivoted away from the seat cushion 14. The first trim panel 20 is slid along the recline mechanism housing 34 thereby overcoming the resistance of the elastic bands 32 and pivoting away from the rear surface 19 of the backrest 12.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A trim assembly for a vehicle seat, comprising:
   a first trim panel adapted to be pivotally connected to a lower region of a rear surface of a backrest that is pivotally adjustable relative to a seat cushion, to cover a gap between the backrest and the seat cushion in an upright position of the backrest; and
   a second trim panel connected to the first trim panel to cover the gap in a forward position of the backrest relative to the seat cushion; and
   wherein the second trim panel is pivotally connected to the first trim panel to pivot away from the seat cushion in a rearward position of the backrest.

2. The trim assembly of claim 1 further comprising a third trim panel pivotally connected to the second trim panel and spaced apart from the first trim panel to cover a portion of the seat cushion in the forward position.

3. The trim assembly of claim 2 further comprising only three trim panels.

4. The trim assembly of claim 2 wherein the third trim panel is sized to contact and slide upon a vehicle floor in the rearward position.

5. The trim assembly of claim 2, wherein the third trim panel comprises a plastic board.

6. The trim assembly of claim 1, further comprising a first strip of nonwoven material that interconnects the first trim panel and the second trim panel.

7. The trim assembly of claim 6, further comprising:
   a third trim panel pivotally connected to the second trim panel and spaced apart from the first trim panel to cover a portion of the seat cushion in the forward position; and
   a second strip of nonwoven material interconnecting the third trim panel and the second trim panel.

8. The trim assembly of claim 7, wherein the first trim panel, the second trim panel, and the third trim panel, each comprise carpet over the trim panel.

9. The trim assembly of claim 1 further comprising a biasing member attached to the first trim panel to bias the first trim panel against the rear surface of the backrest.

10. The trim assembly of claim 9 wherein the biasing member further comprises a plurality of elastic bands.

11. The trim assembly of claim 10, wherein the plurality of elastic bands is sewn to one of the trim panels.

12. The trim assembly of claim 1, wherein the first trim panel and the second trim panel each comprise a plastic board.

13. A vehicle seat assembly comprising:
    a seat cushion;
    a backrest pivotally connected to the seat cushion; and
    a trim assembly of claim 1, wherein the first trim panel is sewn to the lower region of the rear surface of the backrest.

14. The vehicle seat assembly of claim 13, wherein the backrest is pivotally connected to the seat cushion between the forward position and a rearward position.

15. The vehicle seat assembly of claim 13, wherein the trim assembly is displaced over the seat cushion in the forward position to cover the gap between the backrest and the seat cushion.

16. A vehicle seat assembly comprising:
    a seat cushion;
    a backrest pivotally connected to the seat cushion between a forward position and a rearward position;
    a first trim panel pivotally connected to a lower region of a rear surface of the backrest to cover a gap between the backrest and the seat cushion in an upright position of the backrest;
    a second trim panel pivotally connected to the first trim panel to cover the gap in the forward position of the backrest relative to the seat cushion, and to pivot away from the seat cushion in the rearward position of the backrest;
    a third trim panel pivotally connected to the second trim panel and spaced apart from the first trim panel to cover a portion of the seat cushion in the forward position, wherein the third trim panel is sized to contact and slide upon a vehicle floor in the rearward position;
    a plurality of elastic bands sewn to the first trim panel and the backrest to bias the first trim panel against the rear surface of the backrest;
    a first strip of nonwoven material interconnecting the first trim panel and the second trim panel;
    a second strip of nonwoven material interconnecting the third trim panel and the second trim panel; and
    a carpet material that covers the first trim panel, the second trim panel, and the third trim panel; and
    wherein the first, second and third trim panels are displaced over the seat cushion in the forward position to cover the gap between the backrest and the seat cushion.

17. The vehicle seat assembly of claim 16 further comprising only three trim panels, the three trim panels consisting of the first trim panel, second trim panel, and third trim panel.

18. A trim assembly for a vehicle seat, comprising:
    a first trim panel adapted to be pivotally connected to a lower region of a rear surface of a backrest that is pivotally adjustable relative to a seat cushion, to cover a gap between the backrest and the seat cushion in an upright position of the backrest;
    a second trim panel connected to the first trim panel to cover the gap in a forward position of the backrest relative to the seat cushion; and
    a first strip of nonwoven material that interconnects the first trim panel and the second trim panel.

19. A trim assembly for a vehicle seat, comprising:
    a first trim panel adapted to be pivotally connected to a lower region of a rear surface of a backrest that is pivotally adjustable relative to a seat cushion, to cover a gap between the backrest and the seat cushion in an upright position of the backrest;
    a second trim panel connected to the first trim panel to cover the gap in a forward position of the backrest relative to the seat cushion;

a biasing member attached to the first trim panel to bias the first trim panel against the rear surface of the backrest;

wherein the biasing member further comprises a plurality of elastic bands.

20. A vehicle seat assembly comprising:

a seat cushion;

a backrest pivotally connected to the seat cushion; and a trim assembly for a vehicle seat, comprising:

a first trim panel adapted to be pivotally connected to a lower region of a rear surface of a backrest that is pivotally adjustable relative to a seat cushion, to cover a gap between the backrest and the seat cushion in an upright position of the backrest, and a second trim panel connected to the first trim panel to cover the gap in a forward position of the backrest relative to the seat cushion; and wherein the first trim panel is sewn to the lower region of the rear surface of the backrest.

\* \* \* \* \*